(12) United States Patent
Barraud et al.

(10) Patent No.: US 7,695,385 B2
(45) Date of Patent: Apr. 13, 2010

(54) BELT ROLLER DEVICE

(75) Inventors: Pierre-Julien Barraud, Rochecorbon (FR); Laurent Varnoux, Tours (FR); Romuald Lescorail, Tours (FR)

(73) Assignee: Aktiebolaget SKF, Göteborg (SE)

( * ) Notice: Subject to any disclaimer, the term of this patent is extended or adjusted under 35 U.S.C. 154(b) by 391 days.

(21) Appl. No.: 11/484,321

(22) Filed: Jul. 11, 2006

(65) Prior Publication Data

US 2007/0025655 A1 Feb. 1, 2007

(30) Foreign Application Priority Data

Jul. 27, 2005 (FR) .................. 05 07997

(51) Int. Cl.
*F16H 7/20* (2006.01)
(52) U.S. Cl. ...................... 474/199; 384/484
(58) Field of Classification Search ................ 384/478, 384/484, 488, 546–547, 542; 474/198–199, 474/166; 301/5.301, 5.7, 5.305, 5.309
See application file for complete search history.

(56) References Cited

U.S. PATENT DOCUMENTS

| | | | | |
|---|---|---|---|---|
| 2,241,686 A | * | 5/1941 | Ware | 301/108.3 |
| 4,602,875 A | * | 7/1986 | Doerr et al. | 384/547 |
| 4,863,293 A | * | 9/1989 | Sytsma | 384/482 |
| 6,241,257 B1 | * | 6/2001 | Hauck et al. | 277/637 |
| 6,357,926 B1 | * | 3/2002 | Hauck et al. | 384/546 |
| 6,612,749 B2 | * | 9/2003 | Arnault et al. | 384/607 |
| 7,435,005 B2 | | 10/2008 | Schmidl et al. | |
| 2004/0097313 A1 | | 5/2004 | Singer | |
| 2004/0235599 A1 | | 11/2004 | Ozorak et al. | |
| 2005/0026729 A1 | * | 2/2005 | Schenk et al. | 474/101 |

FOREIGN PATENT DOCUMENTS

| | | |
|---|---|---|
| DE | 198 36 191 A1 | 2/2000 |
| DE | 100 35 488 A1 | 1/2002 |
| DE | 100 36 765 A1 | 2/2002 |
| EP | 1 120 584 A1 | 8/2001 |
| FR | 2 751 392 A1 | 1/1998 |

OTHER PUBLICATIONS

French Search Report for FR 0507997 issued April 13, 2006.

* cited by examiner

*Primary Examiner*—Robert A Siconolfi
*Assistant Examiner*—Anna Momper
(74) *Attorney, Agent, or Firm*—Meyertons, Hood, Kivlin, Kowert & Goetzel, P.C.; Eric B. Meyertons

(57) ABSTRACT

Belt roller device, comprising a pulley, a rolling bearing, a protective end-plate, a screw immobilized axially relative to the rolling bearing, and a retaining element mounted on a stem of the screw and forming an axial stop for the protective end-plate, the said protective end-plate being designed to come to bear against a radial face of the inner race of the rolling bearing.

10 Claims, 5 Drawing Sheets

BELT ROLLER DEVICE

The invention relates to the field of belt rollers, for example the drive rollers or tensioner rollers for a belt for distribution or for driving accessories used on motor vehicles.

Such a roller usually comprises a pulley mounted freely on a fixed element. The roller is mounted on the mechanical member that receives it, for example the engine block, or else a pivoting arm of a belt tensioner device.

Belt rollers are preferably delivered to the equipment suppliers or the manufacturers of motor vehicles fitted with their screws and often with additional protective end-plates, helping to protect the roller against the pollutants or the spatterings from the outside environment. It is then desirable that the roller should form an assembly that cannot be dismantled, is easy to handle and transport, has no risk of accidental dismantling and must be able to be mounted with no other particular preparation via a simple tightening of the screw.

Document EP-A-1236934 (DAYCO EUROPE) describes a pulley assembly whose screw is retained relative to a fixed part by means of an O-ring seal. It is a pulley assembly designed to be mounted on the end of an internal combustion engine crankshaft and consequently has no rolling bearing and end-plate.

Document DE-A-19836191 (INA Wälzlager Schaeffler) describes a bearing in the inner race of which a screw is mounted. A radially prestressed elastic open ring is placed between the screw and the bore of the inner race to hold the screw in the inner race.

Document FR-A-2771467 (SKF) relates to an attachment device for a belt pulley, comprising a screw and a sealing washer interposed between the head of the screw and the inner bearing race. The sealing washer is directly attached axially and radially to the inner race of the bearing and has protrusions penetrating into the bore of the inner race to immobilize the screw axially and prevent it from falling during transport while interacting with the radial protrusions on the barrel of the screw.

An aim of the invention is to provide a bearing associated with an end-plate and a screw that is particularly economical, easy to mount, forming a subassembly that cannot be dismantled and having a reduced axial and radial space requirement.

A belt roller device includes a pulley, a rolling bearing, a protective end-plate and a screw. The screw is immobilized axially relative to the rolling bearing. The device includes a retaining element mounted on a stem of the screw and forming an axial stop for the protective end-plate. The said protective end-plate is designed to come to bear against a radial face of the inner non-rotating race of the rolling bearing. This provides an assembly that is virtually impossible to dismantle unintentionally.

Advantageously, the retaining element is distinct from the end-plate. The retaining element may be of a structure that is simple and economic to manufacture. The retaining element may be optimized for an axial retention function.

In one embodiment, the retaining element is mounted on a threaded part of the screw.

In another embodiment, the retaining element is mounted on a non-threaded part of the screw.

In one embodiment, the retaining element presses on a substantially radial surface of the protective end-plate.

In one embodiment, the retaining element is placed in a space delimited axially and radially by the bore of the inner race of the rolling bearing. The space requirement is very small.

In one embodiment, the retaining element includes a washer provided with elastic tabs.

In one embodiment, the retaining element includes a washer provided with substantially radial lugs.

In one embodiment, the retaining element is placed inside an axial portion of the protective end-plate, the said axial portion being centred in a bore of the inner race of the rolling bearing.

In one embodiment, the device includes two protective end-plates. The end-plates may be identical. One of the end-plates may be held between the head of the screw and a radial face of the non-rotating race.

In one embodiment, the screw is centred in a central opening of at least one end-plate. The screw is easier to mount.

The retaining element or lockwasher may be obtained at very low cost, for example by cutting out on the press from a strip of metal sheet or else by injection moulding in a multi-die mould. The retaining element may be mounted on the screw with a simple axial push. It is therefore possible to dispense with a helicoidal screwing motion. Only the end of the stem of the screw protrudes from the pulley. The head of the screw, the retaining element and the end-plates may be housed in the space defined radially and axially by the contour of the pulley. The space requirement of the subassembly is therefore particularly small. One or two end-plates may be held on the screw. The end-plates may be sleeve-fitted into the bore of the inner race with a large tolerance, because the subassembly cannot be dismantled. This reduces the risks of deformation of the inner race and makes it easier to mount the end-plates in the inner race. Finally, it is possible to use two identical end-plates which is particularly valuable for reducing costs by standardization. The assembly thus constituted may be transported, handled and mounted directly onto the engine block or the piece that receives it without any other intermediate operation. The tightening of the screw may be the only operation for mounting the assembly onto the engine or more usually onto a support.

The present invention will be better understood on reading the detailed description of a number of embodiments taken as non-limiting examples and illustrated by the appended drawings, in which.

Figure 1:
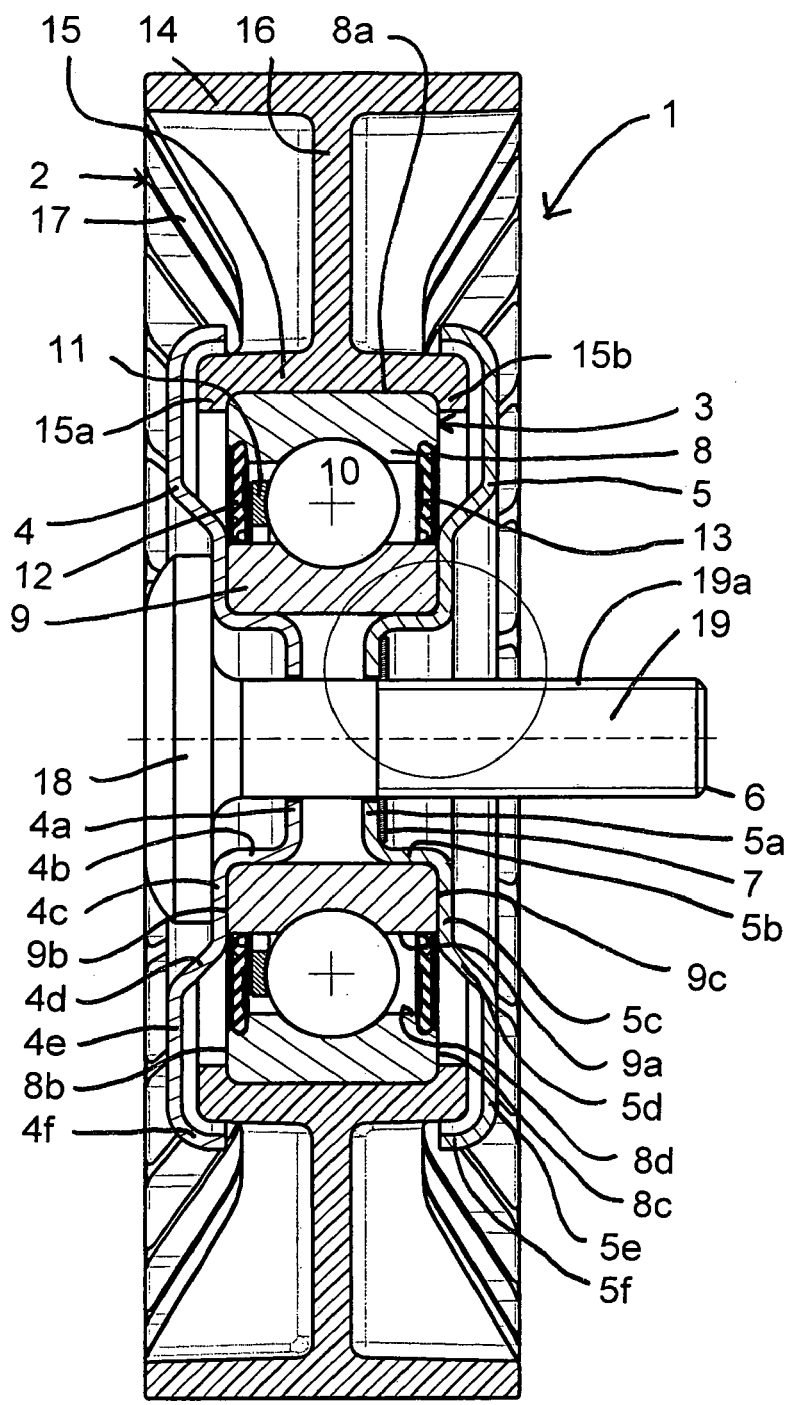
FIG. 1 is a view in axial section of a belt roller.

As can be seen in FIG. 1, the roller 1 includes a pulley 2, a rolling bearing 3, two identical end-plates 4 and 5, a screw 6 and a lockwasher 7. The lockwasher can be seen in greater detail in FIG. 2.

The rolling bearing 3 includes an outer race 8, an inner race 9, a row of rolling elements 10, here balls, placed between a toroidal raceway of the outer race 8 and a toroidal raceway of the inner race 9, a cage 11 maintaining the circumferential spacing of the rolling elements 10 and two seals 12 and 13 that are symmetrical relative to a radial plane passing through the centre of the rolling elements 10. The outer race 8 includes an outer axial surface 8a, two transverse surfaces 8b and 8c and a bore 8d from which the raceway is formed. Between the bore 8d and the transverse surfaces 8b and 8c respectively two annular grooves are provided in which the seals 12 and 13 are fixed. The seals 12 and 13 may include a rigid, for example metal, stiffening element over which is moulded a flexible material, made for example of elastomer, which forms a friction lip on the inner race 9.

The inner race 9 includes an outer surface 9a from which the raceway is formed and against which the seals 12 and 13 come to brush, two transverse radial surfaces 9b and 9c and a bore 9d. Usually, the rolling bearing 3 is symmetrical relative to a radial plane passing through the centre of the rolling elements 10. The races 8 and 9 are obtained by machining with chips being removed from a portion of steel tube, thus conferring on the said races 8 and 9 a thinner thickness at the location of the raceways. In the embodiment represented, the outer race 8 is rotating and the inner race 9 is non-rotating.

The pulley 2 that is one-piece has an outer axial portion 14, an inner axial portion 15, an intermediate radial portion 16 placed between the axial portions 14 and 15 and a plurality of radial ribs 17 extending between the axial portions 14 and 15. The axial portions 14 and 15 and the radial portion 16 have an annular shape. The ribs 17 extend radially either side of the radial annular portion 16 and are delimited by the ends of the axial outer portion 14. The axial outer portion 14 has an axial length greater than that of the axial inner portion 15. The axial length of the ribs 17 therefore decreases towards the inside and ends in the axial inner portion 15 while having an axial length shorter than the said axial inner portion 15.

The axial inner portion 15 has two radial edges 15a and 15b directed inwards from its axial ends. The radial edges 15a and 15b delimit an annular axial surface of a shape that complements the outer surface 8a of the outer ring 8. The pulley 2 may be made of metal sheet and be sleeve-fitted onto the outer race 8 or else, as here, the pulley 2 may be overmoulded onto the outer race 8. Producing the pulley by injection moulding makes it possible to give it complex shapes while retaining a great lightness and relatively low manufacturing cost. More generally, the pulley 2 may or may not be made of synthetic material and is designed to interact with a belt not shown in contact with the outer surface of the axial outer portion 14.

The end-plates 4, 5 include a first radial portion 4a, 5a, of small diameter, forming the small diameter end of the end-plate 4, 5, an axial portion 4b, 5b, situated in the extension of the outer edge of the first radial portion 4a, 5a, a second radial portion 4c, 5c directed outwards from the radial portion 4b, 5b, a frustoconical portion 4d, 5d extending from the large diameter end of the second radial portion 4c, 5c and extending radially on the opposite side from the first radial portion 4a, 5a, a third radial portion 4e, 5e extending outwards from the large diameter end of the frustoconical portion 4d, 5d and a large diameter rounded edge 4f, 5f occupying an angular sector of the order of 90° and extending radially in the direction of the first radial portion 4a, 5a.

The axial portion 4b, 5b is centred in the bore 9d of the inner race 9. The second radial portion 4c, 5c is in contact with the transverse surface 9b, 9c of the inner race 9. The oblique portion 4d, 5d extends substantially at the seals 12 and 13 and tends to travel away from the said seals 12 and 13 going outwards. The third radial portion 4e, 5e is placed radially substantially at the seals 12 and 13 of the outer race 8 and at the axial inner portion 15 of the pulley 2. The rounded portion 4f, 5f comes to surround the outer corner of the axial inner portion 15 of the pulley 2 while forming a narrow passageway. The end of the rounded portion 4f, 5f is placed at a short distance from the ribs 17. The end-plates 4 and 5 therefore provide a seal by narrow passageway that reduces the risk of ingress of external pollutants close to the rolling bearing 3. Naturally, the seals 12 and 13 participate in the said seal and further reduce the risk of harmful ingress.

The screw 6 comprises a head 18 and a stem 19. The stem 19 includes a threaded part 19a and a smooth part 19b placed between the threaded part 19a and the head 18. The smooth part 19 is in contact with the small diameter free end of the first radial portion 4a, 5a of the end-plates 4 and 5. The head 18 is relatively flat and presses against the second radial portion 4b of the end-plate 4, the end of the head 18 being level with the radial plane defined by the axial outer portion 14 of the pulley 2 axially on the side of the end-plate 4 on the opposite side to the end-plate 5.

The retaining element or lockwasher 7 is mounted on the threaded part 19a of the stem 19 of the screw 6 and presses axially against the first radial portion 5a of the end-plate 5, on the side opposite to the head 18. The retaining element 7 includes an annular portion 20 and tabs 21 directed inwards from the annular portion 20 and having, in the free state, an internal diameter less than the external diameter of the threaded part 19a of the stem 19 of the screw 6.

Figure 2:
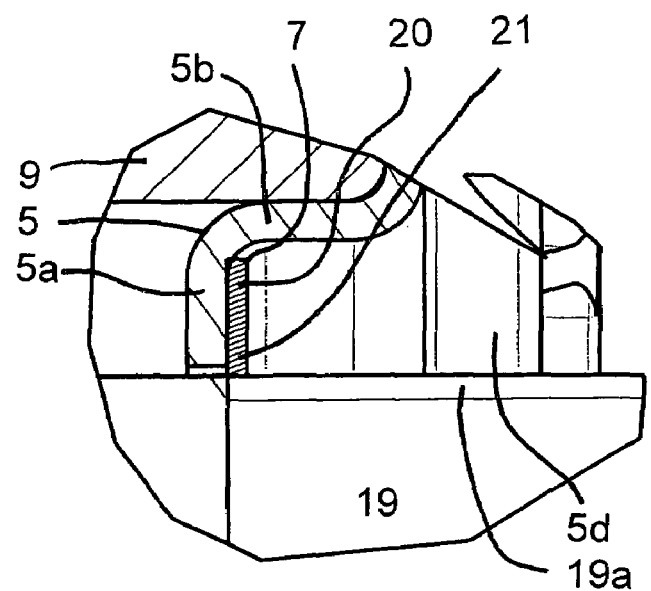
FIG. 2 is a detail view of FIG. 1.

As illustrated in FIGS. 1 and 2, the annular portion 20 of the retaining element 7 presses axially against the first radial portion 5a of the end-plate 5. The tabs 21, slightly deformed during mounting, are braced between the threads of the threaded part 19a of the stem 19 of the screw 6 and the annular part 20 that is not very likely to deform radially. The retaining element 7 may be mounted on the screw 6 by a simple axial movement, the tabs 21 passing over the threads of the threaded part 19 until the annular part 20 comes into contact with the end-plate 5. The screw 6 and the retaining element 7 axially coupled to the said screw 6 together hold the end-plate 4 in contact with the head 18 of the screw 6, the end-plate 5 in contact with the retaining element 7 and the inner race 9 of the bearing 3 placed between the two end-plates 4 and 5. The result is that an assembly that cannot be dismantled is formed by the pulley 2, the rolling bearing 3, the end-plates 4 and 5, the screw 6 and the retaining element 7.

Naturally, the presence of the end-plate 4 is desirable but not essential. In the absence of the end-plate 4, the head of the screw is in direct contact with the inner race. However, the presence of the end-plate 4 makes it possible to provide excellent centering of the screw 6 in the two small diameter radial portions 4a and 5a of the end-plates 4 and 5, ensuring the coaxiality of the screw 6, on the one hand, and of the pulley 2 and of the rolling bearing 3, on the other hand, which may make it easier to screw the screw 6 onto a support provided with a threaded hole for this purpose.

The end-plates 4 and 5 may be manufactured economically by cutting and stamping a flank of metal sheet. The retaining element 7 may be manufactured simply by cutting out a strip of metal sheet on the press.

Figure 3:
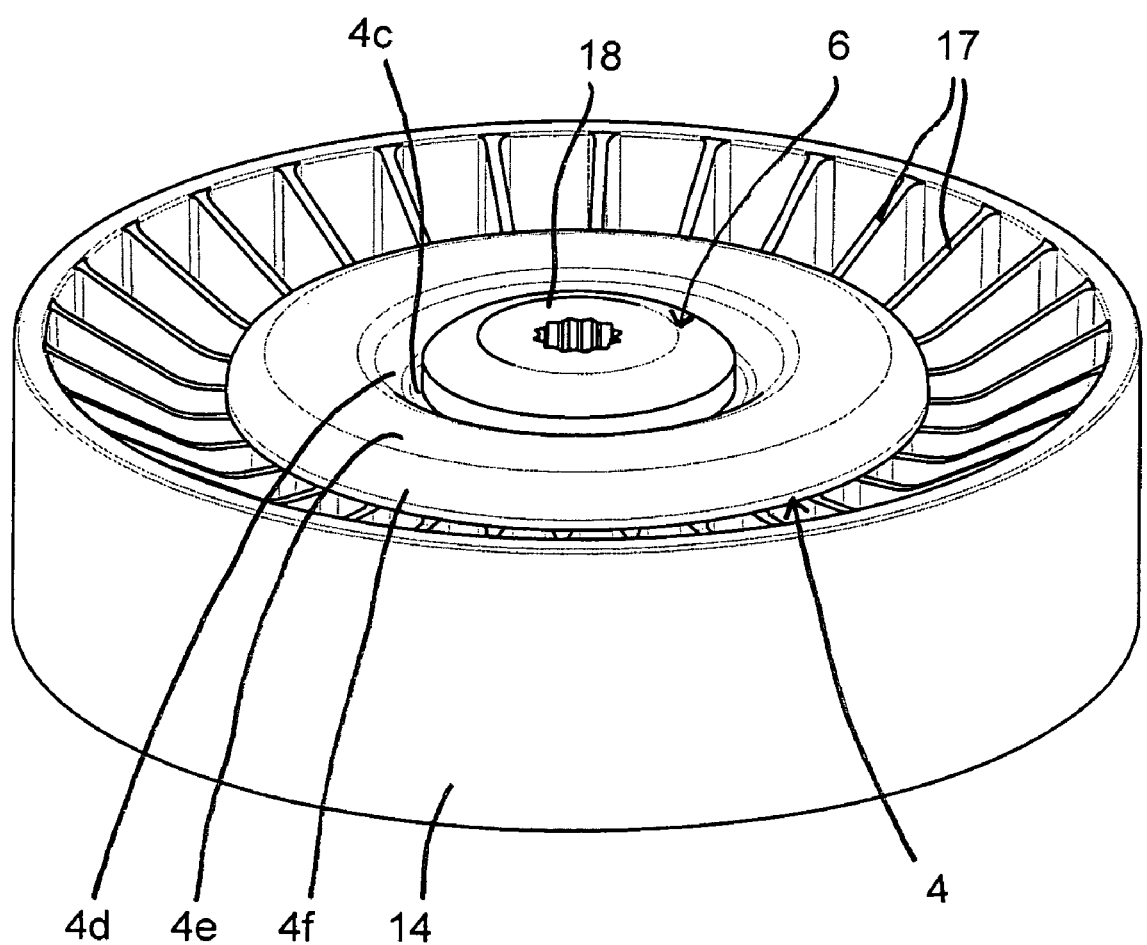
FIG. 3 is a view in perspective of the roller of FIG. 1.

As can be seen in FIGS. 1 and 3, the head 18 of the screw 6 is level with the radial plane defining the space requirement of the pulley 2, that is to say the radial plane passing through the end edge of the axial outer portion 14 of the pulley 2. Thus, the screw 6, the retaining element 7 and the end-plates 4 and 5 do not increase the space requirement of the assembly, the space requirement remaining defined by that of the pulley 2. Naturally, the end of the threaded part 19a of the stem 19 of the screw 6 is designed to be screwed into a threaded hole and consequently not affect the space requirement. In addition, the length of the stem 6 may be adapted to the intended application.

Figure 4:
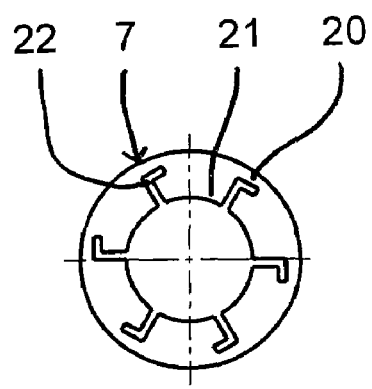
FIG. 4 is a front view in elevation of a lockwasher in the free state.

The retaining element 7 is more easily seen in FIG. 4. The retaining element 7 has, in the free state, the overall shape of a flat washer provided with a plurality of L-shaped cut-outs 22, defining an equal number of tabs 21 that are axially relatively flexible. The cut-outs 22 include a radial section extending outwards from the bore of the retaining element 7, then a section perpendicular to the radial portion and extending a relatively short distance from the outer edge of the retaining element 7. In other words, the tabs 21 extend axially over a major part of the retaining element and the annular part 20 extends over a small part.

In other embodiments, the cut-outs 22 may have a purely radial shape, or else a rounded shape in a quarter circle, or else an oblique shape.

Figure 5:
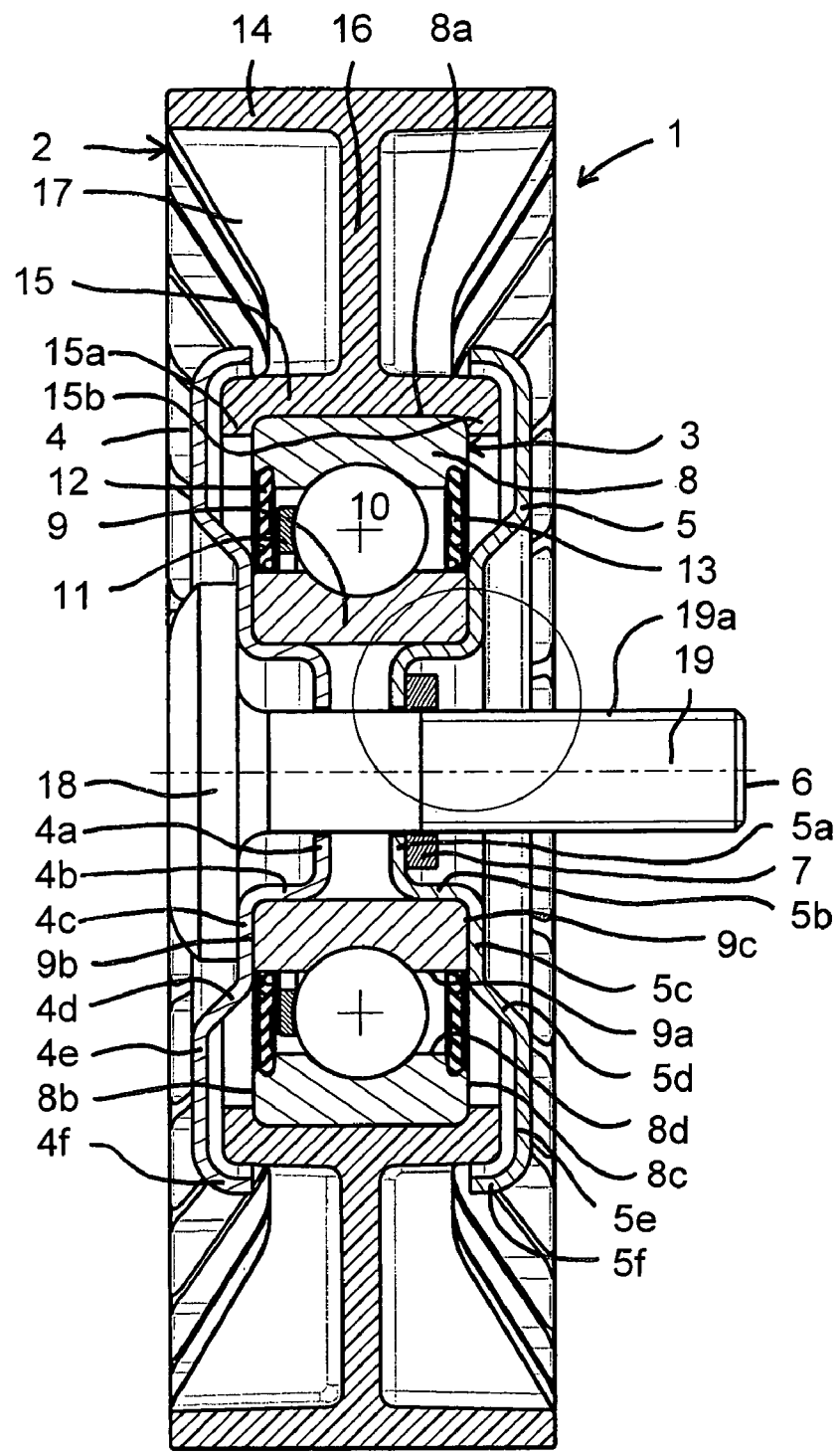
FIG. 5 is a view in axial section of a belt roller according to another embodiment.
Figure 7:
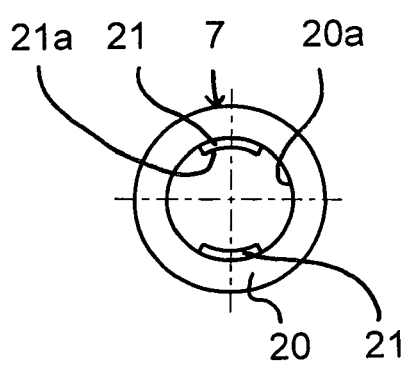
FIG. 7 is a view in perspective of a lockwasher in the free state according to another embodiment.
Figure 6:
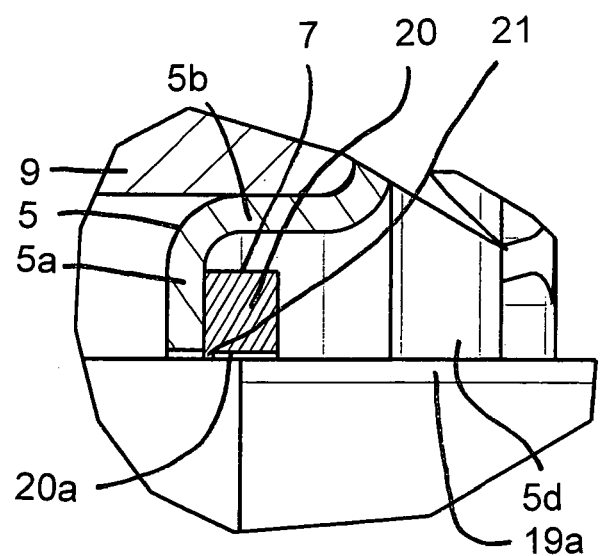
FIG. 6 is a detail view of FIG. 5.

In the embodiment illustrated in FIG. 5, the retaining element 7 has the shape of a flat washer provided with an annular portion 20 having a bore 20a, from which a plurality of lugs 21, here two in number, extend radially inwards, each lug 21 having a rounded, small diameter end 21a, with a curvature to match the screw 6 onto which the retaining element 7 is to be mounted, for example with a curvature equal to that of the bore 20a or else of the stem 19 of the screw 6. The retaining element 7 illustrated in FIG. 6 may advantageously be made of synthetic material by moulding in a multiple-die mould.

As in the preceding embodiment, during the mounting of the retaining element 7 onto the stem 19 of the screw 6, the lugs 21 deform when the retaining element 7 is inserted axially onto the stem 19 until it is brought to abut the end-plate 5. The retaining element 7 is then prevented from moving in the opposite direction, because of the bracing and/or clamping of the lugs 21 on the stem 19 of the screw 6. The retention contact may be produced on the threaded part 19a, but also on the part 19b of the stem 19 where appropriate.

The user benefits from a compact assembly, with an economical cost price, that is easy to mount, having a reduced risk of loss of parts and providing excellent protection of the rolling bearing of the roller. Having a retaining element distinct from the end-plates makes it possible to produce end-plates of relatively simple shape and to use two identical end-plates on either side of the rolling bearing 3.

The invention claimed is:

1. A belt roller device, comprising a pulley, a rolling bearing, a protective end-plate, a screw, the screw being immobilized axially relative to the rolling bearing, and a retaining element mounted on a stem of the screw and forming an axial stop for the protective end-plate, wherein the protective end-plate is configured to bear against a radial face of an inner race of the rolling bearing, and comprises an axial portion centered in a bore of the inner race, and a radial portion directed inwards from the axial portion for the centering of the screw, the retaining element being a flat washer distinct from the end-plate and contained in a space delimited axially and radially by a bore of the inner race, the flat washer being placed inside the axial portion of the protective end-plate and pressing axially against the radial portion of the end plate.

2. The device of claim 1, wherein the retaining element is mounted on a threaded part of the screw.

3. The device of claim 1, wherein the retaining element is mounted on a non-threaded part of the screw.

4. The device of claim 1, wherein the retaining element comprises one or more elastic tabs.

5. The device of claim 1, wherein the retaining element comprises one or more substantially radial lugs.

6. The device of claim 1, comprising an additional protective end-plate.

7. The device of claim 6, wherein one of the protective end-plates is held between the head of the screw and a radial face of the non-rotating race.

8. The device of claim 6, wherein the protective end-plate and the additional protective end-plate are identical.

9. The device of claim 1, wherein the screw is centered in a central opening of at least one end-plate.

10. The device of claim 7, wherein the two protective end-plates are identical.

* * * * *